United States Patent
Blankenhagen et al.

(10) Patent No.: US 10,493,732 B2
(45) Date of Patent: Dec. 3, 2019

(54) CO-EXTRUDED PLASTIC FILM FOR USE WITH A VEHICLE SEAT

(71) Applicant: Petoskey Plastics, Inc., Petoskey, MI (US)

(72) Inventors: David James Blankenhagen, Petoskey, MI (US); Michael Neff Tramontini, Harbor Springs, MI (US)

( * ) Notice: Subject to any disclaimer, the term of this patent is extended or adjusted under 35 U.S.C. 154(b) by 24 days.

(21) Appl. No.: 15/013,836

(22) Filed: Feb. 2, 2016

(65) Prior Publication Data
US 2016/0221310 A1    Aug. 4, 2016

Related U.S. Application Data

(60) Provisional application No. 62/111,178, filed on Feb. 3, 2015.

(51) Int. Cl.
| | |
|---|---|
| *B32B 27/08* | (2006.01) |
| *B32B 7/02* | (2019.01) |
| *B32B 27/32* | (2006.01) |
| *B32B 27/20* | (2006.01) |

(52) U.S. Cl.
CPC .............. *B32B 27/08* (2013.01); *B32B 7/02* (2013.01); *B32B 27/20* (2013.01); *B32B 27/32* (2013.01); *B32B 2264/104* (2013.01); *B32B 2307/746* (2013.01); *B32B 2605/00* (2013.01); *Y10T 428/2495* (2015.01); *Y10T 428/24942* (2015.01); *Y10T 428/31855* (2015.04); *Y10T 428/31909* (2015.04); *Y10T 428/31913* (2015.04); *Y10T 428/31938* (2015.04)

(58) Field of Classification Search
CPC ... B32B 27/32; B32B 2250/242; B32B 27/18; B32B 27/20; B32B 2264/104; B32B 2264/10; B32B 7/00; B32B 7/02; B32B 2307/70; B32B 2307/744; B32B 2307/746; B32B 27/327; B32B 2323/00; B32B 2323/04; B32B 2323/046; Y10T 428/31855; Y10T 428/31909; Y10T 428/31938; Y10T 428/25; Y10T 428/258; Y10T 428/24942; Y10T 428/2495; Y10T 428/24975; Y10T 428/26; Y10T 428/261; Y10T 428/263; Y10T 428/264; Y10T 428/265; Y10T 428/266; Y10T 428/269; Y10T 428/31913; Y10T 428/31917; Y10T 428/31924; Y10T 428/31931; C08K 2003/265; C08K 3/26; C08K 3/24; C08K 3/18; C08K 3/00; C08K 3/01; C08K 3/013; C08K 3/34; C08K 3/36; B60N 2/58; B60N 2/60; C08J 5/18; C08L 23/04; C08L 23/06; C08L 23/08; C08L 23/0807; C08L 23/0815; A47C 31/00; A47C 31/10; A47C 31/11

USPC ....... 428/500, 515, 516, 523, 323, 330, 212, 428/213, 215, 216, 220, 332, 333, 334, 428/335, 336, 337, 339, 517, 519, 521; 297/219, 219.1, 228.1, 229

See application file for complete search history.

(56) References Cited

U.S. PATENT DOCUMENTS

| | | | | |
|---|---|---|---|---|
| 3,104,232 | A * | 9/1963 | Clark | C08K 5/20 524/232 |
| 4,430,289 | A * | 2/1984 | McKinney | C08K 13/02 524/445 |
| 4,676,376 | A * | 6/1987 | Keiswetter | B60N 2/60 297/229 |
| 4,884,839 | A * | 12/1989 | Keiswetter | B60N 2/60 297/229 |
| 5,709,431 | A | 1/1998 | Horn | |
| 5,709,925 | A | 1/1998 | Spengler et al. | |
| 5,922,800 | A * | 7/1999 | Crotty | C08K 3/26 524/425 |
| 6,050,639 | A | 4/2000 | Horn | |
| 2005/0256239 | A1* | 11/2005 | Lee | C08L 23/04 524/425 |
| 2007/0260016 | A1* | 11/2007 | Best | B32B 27/32 525/240 |
| 2011/0256333 | A1 | 10/2011 | Lutz et al. | |
| 2012/0217682 | A1* | 8/2012 | Vignola | C08J 5/18 264/555 |

(Continued)

FOREIGN PATENT DOCUMENTS

| | | | | |
|---|---|---|---|---|
| CA | 2092487 A1 * | 9/1993 | | B60N 2/60 |
| DE | 4333051 C1 | 11/1994 | | |

(Continued)

OTHER PUBLICATIONS

Derwent abstract of JP 58-053933 A. (Year: 1983).*

*Primary Examiner* — Maria V Ewald
*Assistant Examiner* — Ethan A. Utt
(74) *Attorney, Agent, or Firm* — Oppenhuizen Law PLC; David L. Oppenhuizen

(57) ABSTRACT

A plastic film for use as a temporary vehicle seat cover to be installed by an automotive manufacturer. The seat cover protects the vehicle's seat from dirt before the vehicle is purchased by a consumer. The plastic film also has minimal acoustic properties so that the vehicle seat does not interfere with routine automotive acoustic testing known as the Buzz, Squeak, and Rattle test. The plastic film also has a high degree of visual clarity to allow a potential consumer to view the vehicle's seat. The plastic film further has a differential of the coefficient of friction on the opposed sides of the film to minimize movement and noise of the film when a driver is in the vehicle.

17 Claims, No Drawings

(56) References Cited

U.S. PATENT DOCUMENTS

| | | | |
|---|---|---|---|
| 2012/0219776 A1* | 8/2012 | Vignola | B32B 27/32 |
| | | | 428/516 |
| 2012/0219813 A1* | 8/2012 | Vignola | B32B 27/08 |
| | | | 428/516 |
| 2012/0219814 A1* | 8/2012 | Vignola | B32B 27/08 |
| | | | 428/523 |
| 2013/0345349 A1* | 12/2013 | Martinelli | B32B 27/18 |
| | | | 524/229 |

FOREIGN PATENT DOCUMENTS

| | | |
|---|---|---|
| EP | 0668142 B1 | 8/1995 |
| EP | 0564872 B1 | 5/1996 |
| EP | 1273642 A2 | 1/2003 |
| EP | 2420379 A1 | 2/2012 |
| JP | 58053933 A * | 3/1983 |
| JP | 2001114917 A | 4/2001 |
| JP | 2008044160 A | 2/2008 |
| JP | 2008126713 A | 6/2008 |
| WO | 2009137401 A1 | 11/2009 |

* cited by examiner

CO-EXTRUDED PLASTIC FILM FOR USE WITH A VEHICLE SEAT

CROSS REFERENCE TO RELATED APPLICATION

This application claims the benefit of U.S. Provisional Application 62/111,178, which was filed on Feb. 3, 2015, the disclosure of which is hereby incorporated by reference.

BACKGROUND OF THE INVENTION

1. Field of the Invention

The present invention pertains to a multi-layered polymer film. More particularly, the present invention pertains to a co-extruded multi-layered polymer film for use with temporary seat covers used to protect vehicular seats in new cars.

2. Description of the Prior Art

It has long been known that automobile manufacturers install temporary seat covers over the seats in new vehicles to protect the seats from wear and dirt before the vehicle is sold to a consumer. These temporary seat covers are installed during the manufacturing process at the assembly plant. One desirable aspect in a temporary seat cover is that it be sufficiently transparent to allow the potential buyer to see the seat.

It is also known that automobile manufacturers routinely test newly-assembled vehicles to verify quality standards are being met in vehicles rolling off the assembly line. One of these tests is commonly referred to as a Buzz, Squeak, and Rattle test, or BSR evaluation. The BSR evaluation is an acoustic test for determining fit and wear of vehicle components as they are perceived acoustically. In other words, the BSR test quantifies the various noises within a vehicle. The BSR test uses highly-sensitive acoustic measuring equipment, and it is regarded seriously in the automotive industry because the initial consumer impression of a vehicle's quality can be negatively impacted if the vehicle is making undesirable noises. It is critical to minimize or eliminate ambient noises in order to properly test the vehicle.

One of the identified undesirable ambient noises comes from temporary protective seat covers. Many of the temporary seat covers used today are produced using low density polyethylene (LDPE), linear low density polyethylene (LLDPE), and high density polyethylene (HDPE). These polymers tend to have moderate to high degrees of modulus of elasticity that cause the seat covers to make noise when moved, bent, or sat upon. In other words, they are relatively stiff and they crinkle.

What makes this issue even worse is that many temporary seat covers are intentionally designed to fit loosely over the vehicle's seats. A loose-fitting seat cover is easier to install during manufacturing, it is easier for the dealer to remove after the car is sold, and also it will fit onto differently-sized seats in multiple vehicles. However, a loose-fitting seat cover also creates more ambient noise because the excessive material allows the seat cover to be easily bent, folded, or twisted.

Thus, there remains a need for a temporary protective seat cover which produces minimal or negligible amounts of ambient noise, and which also is sufficiently transparent to allow a potential buyer to see the seat.

The present invention, as is detailed hereinbelow, seeks to improve upon the existing temporary seat covers by providing a seat cover which is relatively soft and pliable and does not create noise during a BSR evaluation, yet which is also sufficiently transparent to allow potential buyer to view the seat.

SUMMARY OF THE INVENTION

In a first embodiment of the invention, there is provided a plastic film comprising:
(a) an inner layer comprising at least 45% by weight of a thermoplastic polyolefin, and at least 15% by weight of a filler;
(b) a middle layer comprising at least 40% by weight of a thermoplastic polyolefin, and at least 15% by weight of a filler; and
(c) an outer layer comprising at least 45% by weight of a thermoplastic polyolefin, and at least 15% by weight of a filler.

Optionally, each of the inner, middle, and outer layers include at least 3% of a linear low density polyethylene.

In a second embodiment of the invention, there is provided a plastic film comprising:
(a) an inner layer comprising at least 40% by weight of a linear low density polyethylene having an octene comonomer;
(b) a middle layer comprising at least 40% by weight of a thermoplastic polyolefin, at least 15% by weight of a linear low density polyethylene having an octene comonomer, and at least 5% by weight of a filler; and
(c) an outer layer comprising at least 50% by weight of a linear low density polyethylene having an octene comonomer.

Optionally, the inner layer of this second embodiment comprises at least 10% by weight of a thermoplastic polyolefin.

In a third embodiment of the invention, there is provided a plastic film comprising:
(a) an inner layer comprising at least 50% by weight of a linear low density polyethylene having an octene comonomer;
(b) a middle layer comprising at least 50% by weight of a thermoplastic polyolefin, and at least 15% by weight of a linear low density polyethylene having an octene comonomer; and
(c) an outer layer comprising at least 50% by weight of a linear low density polyethylene having an octene comonomer.

Optionally, the middle layer comprises about 50%-90% by thickness of the plastic film. Preferably the middle layer comprises about 70% by thickness of the plastic film, and the inner and outer layers preferably each comprise about 15% by thickness of the plastic film.

Optionally, the inner and outer layers each include at least 5% by weight of a low density polyethylene.

Optionally, the inner layer includes at least 1% by weight of an anti-blocking agent, and the middle and outer layers each include at least 1% by weight of a slip agent.

Optionally, the thermoplastic polyolefin in each layer includes at least one additive selected from the group consisting of: a polypropylene having an ethylene content of 2-90% by weight, a polyethylene plastomer, a plasticized thermoplastic elastomer, a plasticized polyvinyl chloride, an ethylene propylene diene monomer (EPDM) rubber, an ethylene-vinyl acetate copolymer polyethylene, an ethylene methacrylate copolymer polyethylene, a poly(styrene-butadiene-styrene) polymer, and a styrene-isoprene-styrene polymer.

Optionally, the filler is a mineral, or the filler may be selected from the group consisting of: natural silica (silicon dioxide), talc (magnesium silicate), synthetic silica (silicon dioxide), calcium carbonate, ceramic spheres (alumina-silicate ceramic), Kaolin (aluminum silicate), and mica (aluminum potassium silicate).

DETAILED DESCRIPTION OF THE PREFERRED EMBODIMENT

As discussed throughout, any composition percentages that are discussed as being "by weight" are by weight of the specified layer in the plastic film, not a percentage by weight of the entire plastic film.

In accordance with a first embodiment of the present invention, there is provided a plastic film comprising: (a) an inner layer including a thermoplastic polyolefin, a filler and an LLDPE butene carrier resin, LDPE, and an anti block (AB) agent; (b) a middle layer including a thermoplastic elastomer (which could optionally be a polyolefin), a filler and an LLDPE butene carrier resin, and a slip agent; and (c) an outer layer including a thermoplastic polyolefin, a filler and an LLDPE butene carrier resin, LDPE, and a slip agent.

As understood by those having ordinary skill in the art, a thermoplastic polyolefin is polypropylene with rubber compounded with it. Preferably the thermoplastic polyolefin comprises at least 45% by weight of the inner layer, at least 40% by weight of the middle layer, and at least 45% by weight of the outer layer. The thermoplastic polyolefin preferably has a density of about 0.877 $g/cm^3$ and a melt index of about 0.69 g/10 min (230° C./2.16 Kg).

Each of the thermoplastic polyolefin and the thermoplastic elastomer includes at least one additive selected from the group consisting of: a polypropylene having an ethylene content of 2-90% by weight, a polyethylene plastomer, a plasticized thermoplastic elastomer, a plasticized polyvinyl chloride, an ethylene propylene diene monomer (EPDM) rubber, an ethylene-vinyl acetate copolymer polyethylene, an ethylene methacrylate copolymer polyethylene, a poly (styrene-butadiene-styrene) polymer, and a styrene-isoprene-styrene polymer.

The plastic film includes a filler which reduces the modulus of elasticity, but also lowers the transparency of the plastic film by making it more opaque. The filler may be a mineral, such as natural silica (silicon dioxide), talc (magnesium silicate), calcium carbonate, Kaolin (aluminum silicate), or mica (aluminum potassium silicate). The filler may also be a synthetic compound like ceramic spheres (alumina-silicate ceramic) or synthetic silica (silicon dioxide). Preferably the filler is calcium carbonate ($CaCO_3$).

Preferably the filler comprises at least 15% by weight of the inner layer, at least 15% by weight of the middle layer, and at least 15% by weight of the outer layer. Even more preferably, the filler comprises about 24% of each of the inner, middle, and outer layers.

The filler is delivered by a carrier such as a LLDPE butene carrier resin having a melt index of 1.0 g/10 min and a density of 1.95 $g/cm^3$. The filler and the LLDPE butene carrier resin are preferably provided in a ratio of about 80% filler and 20% LLDPE.

The plastic film also includes LDPE in the inner and outer layers. Preferably the LDPE has a melt index of about 0.25 g/10 min and a density of about 0.92 $g/cm^3$. The LDPE comprises at least 5% by weight of the inner and outer layers. More preferably, the LDPE comprises about 10% of the inner and outer layers.

The inner layer preferably includes at least 1% by weight of an anti-blocking compound. The anti-blocking compound includes an anti block agent, which is well-known in the art for reducing or blocking the adhesion between two adjacent layers of film, such as two walls of a plastic bag. The anti block agent can be any suitable type of agent that is well-known in the art, including but not limited to, natural silica (silicon dioxide), talc (magnesium silicate), synthetic silica (silicon dioxide), calcium carbonate, ceramic spheres (alumina-silicate ceramic), Kaolin (aluminum silicate), or mica (aluminum potassium silicate). The anti-blocking compound preferably comprises about 60% talc and about 40% LLDPE butene carrier resin, and preferably has a melt index of 2.0 g/10 min and a density of 1.53 $g/cm^3$.

The middle layer includes a thermoplastic elastomer in addition to the thermoplastic polyolefin. The thermoplastic elastomer may or may not be a polyolefin. The thermoplastic elastomer adds flexibility and elastic recovery to the plastic film. The thermoplastic elastomer has a melt index of about 2.5 g/10 min and a density of about 0.87 $g/cm^3$. The thermoplastic elastomer preferably comprises at least 10% by weight of the middle layer, and even more preferably, about 15% by weight of the middle layer Each of the middle and outer layers also include at least 1% by weight of a slip agent. Slip agents are well-known to those having ordinary skill in the art, and they are provided to reduce the coefficient of friction along the surface of the plastic film. Accordingly, the plastic film is less prone to being wrinkled or twisted because the lowered coefficient of friction increases the shear force necessary to manipulate or move the plastic film. The slip agent may be either synthetic or natural, but it is of the type that is well-known in the art, such as a fatty amine Preferably the slip agent comprises about 3% by weight of the middle and outer layers.

It has been determined through experimentation that it is beneficial to create a differential of the coefficient of friction between the inner and outer layers. For example, the coefficient of friction on the outer layer may be 0.375, while the coefficient of friction on the inner layer may be 0.475. It is to be understood that a lower coefficient of friction means less friction at the contact surface. In this case, there is more friction between the film and the car seat than an individual's clothing sitting on the seat and the film.

This differential in the coefficient of friction makes it easier for the user (driver) to move atop the film without moving the film against the vehicle's seat. This minimizes the chance that the film will make noise from being bent, twisted, or stretched. Thus, through experimentation it has been determined that a film will perform well acoustically and minimally interfere with a BSR test if the inner layer (i.e., the layer of the film adjacent to the vehicle's seat) does not include a slip agent, and the outer layer (i.e., the layer of the film adjacent the driver's clothing) includes a slip agent. Preferably the slip agent comprises about 3% by weight of the outer layer.

Preferably the middle layer comprises about 50%-90% by thickness of the plastic film Even more preferably, the middle layer comprises about 70% by thickness of the plastic film, and the inner and outer layers preferably each comprise about 15% by thickness of the plastic film.

According to a second embodiment of the invention, there is provided a plastic film comprising: (a) an inner layer including a linear low density polyethylene having an octene comonomer, a thermoplastic elastomer, LDPE, and an anti-block agent; (b) a middle layer including a thermoplastic polyolefin, a linear low density polyethylene having an octene comonomer, a filler and an LLDPE butene carrier resin, and a slip agent; and (c) an outer layer including a linear low density polyethylene having an octene comonomer, a thermoplastic elastomer, LDPE, and a slip agent.

Preferably the linear low density polyethylene having an octene comonomer has a density of about 0.918 g/cm$^3$ and a melt index of about 1.0 g/10 min. The LLDPE comprises at least 40% by weight of the inner layer, at least 15% by weight of the middle layer, and at least 50% by weight of the outer layer. More preferably, the LLDPE comprises about 67% by weight of the inner layer, about 30% by weight of the middle layer, and about 67% by weight of the outer layer.

The thermoplastic elastomer in this second embodiment is the same type as that discussed above and comprises at least 10% of each of the inner and outer layers. More preferably, the thermoplastic elastomer comprises about 15% of each of the inner and outer layers. Alternatively, the thermoplastic elastomer comprises about 30% of the inner layer, and about 50% of the thermoplastic elastomer in the inner layer is a thermoplastic polyolefin.

According to this embodiment, the inner and outer layers also include at least 5% by weight of LDPE in each of the inner and outer layers. More preferably, the LDPE comprises about 15% of each of the inner and outer layers.

The middle layer of this second embodiment of the invention includes at least 40% by weight of the thermoplastic polyolefin of the type discussed above. More preferably, the middle layer includes about 52% by weight of the thermoplastic polyolefin.

Similarly to the first embodiment described above, this second embodiment of the invention also includes a filler and an LLDPE butene carrier resin, the filler being the same type as that described above. The middle layer includes at least 5% by weight of the filler, and preferably about 12% by weight of the filler.

The second embodiment of the plastic film also includes the same type and amount of anti-block agents and slip agents in the respective inner, middle, and outer layers as that described above with respect to the first embodiment. Preferably the slip agent comprises about 1%-3% by weight of the middle layer, and about 3% by weight of the outer layer.

Lastly, there is provided a third embodiment of the invention for a plastic film that is substantially the same as that in the second embodiment, except that the third embodiment does not include the filler in the middle layer, and instead is replaced by additional thermoplastic polyolefin. In this regard, the middle layer preferably comprises at least 50% by weight of the thermoplastic polyolefin, and more preferably comprises about 67% by weight of the thermoplastic polyolefin.

Each of the three preceding embodiments of the invention produce a film having a varying moduli of elasticity, with the first embodiment having the lowest modulus and being the most opaque, and the third having the highest modulus and being the most transparent. Customer desirability will dictate which of the three embodiments is most desirable to them, although all three provide a plastic film that has a relatively low modulus of elasticity. Furthermore, all three films are capable of withstanding high heats to endure post-extrusion processing that other known films having a low modulus of elasticity cannot withstand.

The multi-layered plastic film may be manufactured using any suitable type of process. In particular, the plastic film is preferably manufactured by blown-film extrusion using a circular die in which the film is blown to a specified size and thickness. The produced film is then manufactured into a seat cover by heat-sealing and cutting the film to size.

Although typical plastics such as EVA and LDPE have a modulus of elasticity that is low enough to be sufficiently quiet for the BSR evaluation, these plastics are not capable of withstanding the high heats encountered when the film is manufactured into the seat cover.

According to the invention described above, there is provided a seat cover which is relatively soft and pliable and does not create noise during a BSR evaluation, yet which is also sufficiently transparent to allow potential buyer to view the seat.

What is claimed is:

1. A plastic film comprising:
   a) an inner layer having a thermoplastic polyolefin, a filler, a linear low density polyethylene (LLDPE) butene carrier resin, a low density polyethylene (LDPE), and an anti-blocking compound;
   b) a middle layer having a thermoplastic elastomer, the filler, the linear low density polyethylene (LLDPE) butene carrier resin, and a slip agent, wherein the middle layer comprises at least 2% by weight of the slip agent; and
   c) an outer layer having the thermoplastic polyolefin, the filler, the linear low density polyethylene (LLDPE) butene carrier resin, the low density polyethylene (LDPE), and the slip agent, wherein the outer layer comprises at least 2% by weight of the slip agent, wherein the inner layer has a higher coefficient of friction than the outer layer.

2. The plastic film as claimed in claim 1, wherein the middle layer comprises about 70% by thickness of the plastic film, and the inner layer and outer layer each comprise about 15% by thickness of the plastic film.

3. The plastic film as claimed in claim 1, wherein the thermoplastic polyolefin and the thermoplastic elastomer further comprise at least one additive, wherein the at least one additive is selected from a group comprising, a polypropylene having an ethylene content of 2%-90% by weight, a polyethylene plastomer, a plasticized thermoplastic elastomer, a plasticized polyvinyl chloride, an ethylene propylene diene monomer (EPDM) rubber, an ethylene-vinyl acetate copolymer polyethylene, an ethylene methacrylate copolymer polyethylene, a poly(styrene-butadiene-styrene) polymer, and a styrene-isoprene-styrene polymer.

4. The plastic film as claimed in claim 1, wherein the filler is selected from a group comprising, a mineral and a synthetic compound; wherein the mineral is selected from a group comprising, natural silica (silicon dioxide), talc (magnesium silicate), calcium carbonate, kaolin (aluminum silicate), or mica (aluminum potassium silicate); and wherein the synthetic compound is selected from a group comprising, ceramic spheres (alumina-silicate ceramic) or synthetic silica (silicon dioxide).

5. The plastic film as claimed in claim 1, wherein the filler and the LLDPE butene carrier resin are in a ratio of 80:20.

6. A plastic film comprising:
   a) an inner layer having a linear low density polyethylene (LLDPE) having an octene comonomer, a thermoplastic elastomer, a low density polyethylene (LDPE), and an anti-blocking compound;
   b) a middle layer having the linear low density polyethylene (LLDPE) having an octene comonomer, a thermoplastic polyolefin, a filler, a linear low density polyethylene (LLDPE) butene carrier resin, and a slip agent, wherein the middle layer comprises at least 2% by weight of the slip agent; and
   c) an outer layer having the linear low density polyethylene (LLDPE) having an octene comonomer, the thermoplastic elastomer, the low density polyethylene (LDPE), and the slip agent, wherein the outer layer comprises at least 2% by weight of the slip agent, wherein the inner layer has a higher coefficient of friction than the outer layer.

7. The plastic film as claimed in claim 6, wherein the inner layer includes at least 1% by weight of the inner layer of the anti-blocking compound.

8. The plastic film as claimed in claim 6, wherein the middle layer comprises about 70% by thickness of the plastic film, and the inner layer and outer layer each comprise about 15% by thickness of the plastic film.

9. The plastic film as claimed in claim 6, wherein the thermoplastic polyolefin and the thermoplastic elastomer further comprise at least one additive.

10. The plastic film as claimed in claim 9, wherein the at least one additive is selected from a group comprising, a polypropylene having an ethylene content of 2%-90% by weight, a polyethylene plastomer, a plasticized thermoplastic elastomer, a plasticized polyvinyl chloride, an ethylene propylene diene monomer (EPDM) rubber, an ethylene-vinyl acetate copolymer polyethylene, an ethylene methacrylate copolymer polyethylene, a poly(styrene-butadiene-styrene) polymer, and a styrene-isoprene-styrene polymer.

11. The plastic film as claimed in claim 6, wherein the filler is selected from a group comprising, a mineral and a synthetic compound.

12. The plastic film as claimed in claim 11, wherein the mineral is selected from a group comprising, natural silica (silicon dioxide), talc (magnesium silicate), calcium carbonate, kaolin (aluminum silicate), or mica (aluminum potassium silicate).

13. The plastic film as claimed in claim 11, wherein the synthetic compound is selected from a group comprising, ceramic spheres (alumina-silicate ceramic) or synthetic silica (silicon dioxide).

14. The plastic film as claimed in claim 6, wherein the filler and the LLDPE butene carrier resin are in a ratio of 80:20.

15. The plastic film as claimed in claim 6, wherein the anti-blocking compound further comprises an anti-block agent and the LLDPE butene carrier resin.

16. The plastic film as claimed in claim 15, wherein the anti-blocking compound further comprises the anti-block agent and the LLDPE butene carrier resin in a ratio of 60:40.

17. A plastic film comprising:
a) an inner layer having a linear low density polyethylene (LLDPE) having an octene comonomer, a thermoplastic elastomer, a low density polyethylene (LDPE), and an anti-block agent;
b) a middle layer having the linear low density polyethylene (LLDPE) having an octene comonomer, a thermoplastic polyolefin, a linear low density polyethylene (LLDPE) butene carrier resin, and a slip agent, wherein the middle layer comprises at least 2% by weight of the slip agent; and
c) an outer layer having the linear low density polyethylene (LLDPE) having an octene comonomer, the thermoplastic elastomer, the low density polyethylene (LDPE), and the slip agent, wherein the outer layer comprises at least 2% by weight of the slip agent,
wherein the inner layer has a higher coefficient of friction than the outer layer.

* * * * *